(12) United States Patent
Mei (10) Patent No.: US 7,821,742 B1
(45) Date of Patent: Oct. 26, 2010

(54) HIGH STROKE SENSITIVITY SUSPENSION WITH LAMINATE LOAD BEAM FOR ADDITIVE LAMINATED AND OTHER INTERCONNECT SUPPORT

(75) Inventor: Shijin Mei, Temecula, CA (US)

(73) Assignee: Magnecomp Corporation, Murrieta, CA (US)

( * ) Notice: Subject to any disclaimer, the term of this patent is extended or adjusted under 35 U.S.C. 154(b) by 1100 days.

(21) Appl. No.: 11/429,804

(22) Filed: May 8, 2006

Related U.S. Application Data (60) Provisional application No. 60/680,646, filed on May 12, 2005.

(51) Int. Cl.
*G11B 5/56* (2006.01)
*G11B 21/24* (2006.01)

(52) U.S. Cl. ............... 360/294.3; 360/244.3; 360/244.5

(58) Field of Classification Search ............. 360/244.5, 360/244.3, 294.4, 244.8, 244.9, 294.3, 245.9
See application file for complete search history.

(56) References Cited

U.S. PATENT DOCUMENTS

| | | | |
|---|---|---|---|
| 6,331,923 B1 | 12/2001 | Mei | |
| 6,335,849 B1 | 1/2002 | Khan et al. | |
| 6,411,475 B1 | 6/2002 | Khan et al. | |
| 6,636,382 B2 * | 10/2003 | Shiraishi | 360/244.3 |

* cited by examiner

*Primary Examiner*—Julie Anne Watko
(74) *Attorney, Agent, or Firm*—Intellectual Property Law Offices of Joel Voelzke, APC (57) ABSTRACT

A high stroke sensitivity microactuated disk drive suspension includes a microactuator, a laminate of first and second outer layers and a plastic inner layer that define a base portion, a spring portion and a beam portion. The base portion has proximate and distal regions coupled by a segment of an outer layer and fixed to the microactuator for relative shifting of the beam portion to the base portion. The segment has a part that is locally arcuate and readily bendable during said shifting for low resistance to shifting giving the suspension high stroke sensitivity.

62 Claims, 12 Drawing Sheets

HIGH STROKE SENSITIVITY SUSPENSION WITH LAMINATE LOAD BEAM FOR ADDITIVE LAMINATED AND OTHER INTERCONNECT SUPPORT

CROSS-REFERENCE TO RELATED APPLICATIONS

This application claims the benefit of U.S. Provisional Application Ser. No. 60/680,646, filed May 12, 2005.

BACKGROUND OF THE INVENTION

1. Field of the Invention

This invention relates to disk drive suspensions, and more particularly to microactuated smaller form factor suspensions where stroke sensitivity, that is size of displacement by the microactuators, has been inadequate.

2. Description of the Related Art

Stroke sensitivity and suspension resonance frequency are among the most important desiderata in piezo-electric microactuator suspension design. Presently available designs achieving desired resonance frequencies do not achieve the desired stroke sensitivity, and vice-versa. Typically, stroke is not high enough if the suspension is 11 mm long or less.

BRIEF SUMMARY OF THE INVENTION

Both desired resonance frequency and stroke sensitivity are achieved in the invention even in 11-mm Pico format suspensions as well as the smaller Femto form factor suspensions. Using an outer layer of a suspension laminate bent into an arcuate, "C", shape eases bending resistance and results in greater stroke distance. Use of a thin laminate layer rather than the usual single element load beam adds to stroke sensitivity as well. Further, use of a thickness-tailored an outer layer of the suspension laminate as the suspension spring, allows close dimensioning of the spring for better spring rates without the drawbacks inherent in etching to a thickness. Since the spring is integral with the laminate portion mounted by the mounting plate, a welding step is not required and typical welding problems such as heating distortions and added production time and costs are avoided. Spring rate is controlled and resonance frequency is also controlled in the invention suspension.

It is an object therefore of the present invention to provided an improved disk drive suspension. It is a further object to provided a suspension load beam formed from a laminate of first and second outer layers joined by an inner layer of plastic and supporting an electrical interconnect such as an additive type laminate that can be a flexible circuit with or without a metal layer. A further object is the provision of a microactuated suspension having increased stroke sensitivity through the use of a relatively thin laminate first or second outer layer to define the relatively shiftable suspension base and beam portions and to have even these easier bending parts locally arcuately shaped centrally of the base portion and at the edges for less resistance to bending and easier beam portion lateral shifting to position a slider at a disk track. Another object includes defining a stiffener, e.g. with one laminate outer layer, and the beam portion with another laminate outer layer that can also define the suspension spring portion, and having local arcuate shapes in the first or second outer laminate layer. Still another object includes providing flexure adjustment at the distal terminus of the suspension by defining bendable tabs whose repositioning adjusts the flexure.

These and other objects of the invention to become apparent hereinafter are realized in a high stroke sensitivity microactuated disk drive suspension comprising a laminate extending in a plane and having first and second outer layers and a plastic inner layer, the suspension having a base portion comprising the first outer layer, a spring portion comprising the first or second outer layer, and a beam portion comprising the first and/or second outer layer, the suspension having a first side for supporting a flexible circuit electrical interconnect and a second oppositely facing side, and a microactuator operatively coupled between the base portion and the beam portion for laterally shifting the beam portion, the base and beam portions being connected through a first or second outer layer segment that is locally arcuate normal to the plane of the laminate.

In this and like embodiments, typically, the base portion comprises the first outer layer, the spring portion comprises the first outer layer, and the beam portion comprises the second outer layer, the beam portion further comprises the first outer layer in second outer layer stiffening relation, the segment is a first outer layer segment, the local arcuateness of the segment extends from the laminate plane away from the suspension first side, the microactuator comprises spaced left and right hand microactuators, the segment local arcuateness extending between the microactuators, the suspension further includes a flexible circuit supported on the suspension first side, the microactuator has a major plane generally parallel with the laminate plane, the suspension defines an edge rail laterally of the microactuator in microactuator protecting relation against forces acting normal to the microactuator major plane, the edge rail being locally deflected to facilitate the lateral shifting of the beam portion, or the microactuator has a major plane generally parallel with the laminate plane, the suspension defines left and right edge rails laterally on either side of the microactuator in microactuator protecting relation against forces acting normal to the microactuator major plane, the edge rails being locally deflected in beam portion lateral movement bendably accommodating relation while protecting the microactuator from forces normal to the lateral movement.

Further in this and like embodiments, typically, the local arcuateness of the segment extends from the laminate plane toward the suspension first side, the microactuator comprises spaced left and right hand microactuators, the segment local arcuateness extending between the microactuators, the suspension further includes a flexible circuit interconnect supported on the suspension first side, the microactuator major plane is generally parallel with the laminate plane, the suspension defines an edge rail laterally of the microactuator in microactuator protecting relation against forces acting normal to the microactuator major plane, the edge rail being locally deflected to facilitate the lateral shifting of the beam portion, or the microactuator major plane is generally parallel with the laminate plane, the suspension defines left and right edge rails laterally on either side of the microactuator in microactuator protecting relation against forces acting normal to the microactuator major plane, the edge rails being locally deflected in beam portion lateral movement bendably accommodating relation while protecting the microactuator from forces normal to the lateral movement.

In a further embodiment, the invention provides a high stroke sensitivity microactuated disk drive suspension in which the base portion comprises the first outer layer, the spring portion comprises the second outer layer, and the beam portion also comprises the second outer layer.

In this and like embodiments, typically, the beam portion further comprises the first outer layer in second outer layer stiffening relation, the segment is a second outer layer segment, the local arcuateness of the segment extends from the laminate plane away from the suspension first side, the microactuator comprises spaced left and right hand microactuators, the segment local arcuateness extending in a plane between the microactuators, the suspension further includes a flexible circuit supported on the suspension first side, the microactuator has a major plane generally parallel with the laminate plane, the suspension defines an edge rail laterally of the microactuator in microactuator protecting relation against forces acting normal to the microactuator major plane, the edge rail being locally deflected to facilitate the lateral shifting of the beam portion, or the microactuator has a major plane generally parallel with the laminate plane, the suspension defines left and right edge rails laterally on either side of the microactuator in microactuator protecting relation against forces acting normal to the microactuator major plane, the edge rails being locally deflected in beam portion lateral movement bendably accommodating relation while protecting the microactuator from forces normal to the lateral movement.

Further in this embodiment, typically, the local arcuateness of the segment extends from the laminate plane toward the suspension first side, the microactuator comprises spaced left and right hand microactuators, the segment local arcuateness extending in a plane between the microactuators, the suspension further includes a flexible circuit supported on the suspension first side, the microactuator has a major plane generally parallel with the laminate plane, the suspension defines an edge rail laterally of the microactuator in microactuator protecting relation against forces acting normal to the microactuator major plane, the edge rail being locally deflected to facilitate the lateral shifting of the beam portion, or the microactuator has a major plane generally parallel with the laminate plane, the suspension defines left and right edge rails laterally on either side of the microactuator in microactuator protecting relation against forces acting normal to the microactuator major plane, the edge rails being locally deflected in beam portion lateral movement bendably accommodating relation while protecting the microactuator from forces normal to the lateral movement.

In a further embodiment, there is provided a high stroke sensitivity microactuated disk drive suspension comprising a laminate of first and second outer layers and a plastic inner layer, the suspension having a base portion comprising the first outer layer, a spring portion comprising the first outer layer, and a beam portion comprising the second outer layer, the base portion having proximate and distal regions attached by a segment of the first outer layer, a microactuator fixed between the base portion and the beam portion for shifting the beam portion laterally relative to the base portion, the first outer layer segment having a locally arcuate part to be readily bendable during the shifting for low resistance to the relative shifting, whereby the suspension has high stroke sensitivity.

In this and like embodiments, typically, there is further included, typically, a flexible circuit electrical interconnect supported by the suspension, the laminate outer layer comprises a stainless steel, or both the laminate second first and outer layers comprise a stainless steel, the inner layer comprises polyimide, the polyimide inner layer is arranged to respond in shear between the first outer layer and the second outer layer during relative shifting of the base portion and the beam portion, there also is a stiffener attached to the beam portion, e.g. a stiffener defined by a further segment of the first outer layer, the first outer layer locally arcuate segment part extends out of the plane of the first outer layer away from the plane of the second outer layer, or the first outer layer locally arcuate segment part extends out of the plane of the first outer layer toward the plane of the second outer layer, the microactuator comprises first and second separately actuable elements fixed to the base portion first outer layer and the beam portion second outer layer, the first and second microactuator elements are laterally spaced, the locally arcuate segment part extending between the microactuators, the locally arcuate segment part comprises spaced left and right arcuate bands extending between the microactuators, the first outer layer further defines left and right edge rails extended laterally of the microactuators in microactuator protecting relation against vertical bending forces thereon, and the left and right edge rails are locally deflected to facilitate lateral shifting adjacent the microactuators.

In a further embodiment, there is provided in accordance with the invention a high stroke sensitivity microactuated disk drive suspension comprising a laminate of first and second outer layers and a plastic inner layer, the suspension having a base portion comprising the first outer layer, a spring portion comprising the second outer layer, and a beam portion comprising the second outer layer, the base portion having proximate and distal regions attached by a segment of the second outer layer, a microactuator fixed between the base portion and the beam portion for shifting the beam portion laterally relative to the base portion, the second outer layer segment having a locally arcuate part to be readily bendable during the shifting for low resistance to the relative shifting, whereby the suspension has high stroke sensitivity.

In this and like embodiments, typically, there is further included a flexible circuit supported by the suspension, the laminate outer layer comprises stainless steel, both the laminate second first and outer layers comprise stainless steel, the inner layer comprises polyimide, the polyimide inner layer is arranged to respond in shear between the first outer layer and the second outer layer during relative shifting of the base portion and the beam portion, there is a stiffener attached to the beam portion, the stiffener is defined by the first outer layer, the first outer layer locally arcuate segment part extends out of the plane of the first outer layer away from the plane of the second outer layer, the first outer layer locally arcuate segment part extends out of the plane of the first outer layer toward the plane of the second outer layer, the microactuator comprises first and second differentially actuable elements fixed to the base portion first outer layer and the beam portion second outer layer, the first and second microactuator elements are laterally spaced, the locally arcuate segment part extending between the microactuators, the locally arcuate segment part comprises spaced left and right arcuate bands extending between the microactuators, the first outer layer further defines left and right edge rails extended laterally of the microactuators in microactuator protecting relation against vertical bending forces thereon, and the left and right edge rails are locally deflected laterally of the microactuators to facilitate lateral shifting.

In a further embodiment having flexure adjustment, a high stroke sensitivity microactuated disk drive suspension is provided comprising a laminate of first and second outer layers and a plastic inner layer, the suspension having a base portion comprising the first outer layer, a spring portion comprising a the first or second outer layer, and a beam portion comprising a the first and/or second outer layer, the base portion having proximate and distal regions attached by a segment of the first outer layer, a microactuator fixed between the base portion and the beam portion for shifting the beam portion laterally relative to the base portion, the beam portion having an area supporting a flexure and a distal terminus beyond the flexure, the distal terminus having laterally spaced tabs arranged to mechanically adjust the configuration of the beam portion area supporting the flexure and the flexure thereby responsive to bending force on the tabs.

In the method aspects of this previous embodiment, the invention provides a method of adjusting the flexure of a disk drive suspension comprising a laminate of first and second outer layers and a plastic inner layer, the suspension having a base portion comprising the first outer layer, a spring portion comprising the first or second outer layer, and a beam portion comprising the second layer, including defining on the beam portion an area supporting the flexure, defining a beam portion distal terminus beyond the flexure having bendable laterally spaced tabs, and mechanically adjusting the configuration of the beam portion area and the flexure thereby in response to bending of the tabs.

In other method aspects of the invention, there is provided the method of manufacturing a high stroke sensitivity microactuated disk drive suspension, including forming from a laminate of first and second outer layers and a plastic inner layer a base portion, a spring portion, and a beam portion, coupling base portion proximate and distal regions with a locally arcuate segment of thereof, and fixing a microactuator to the proximate and distal regions for relative shifting thereof, whereby the segment bends readily during the shifting for low resistance to shifting and the suspension has high stroke sensitivity.

In this and like embodiments, typically, the method further includes forming the base portion and the segment from the first outer layer, forming the beam portion and the segment from the second outer layer, forming edge rails on the base portion, and fixing differentially actuable left and right microactuators for shifting of the beam portion relative to the base portion while connecting the beam and base portions with an arcuate segment of the first or second outer layer.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
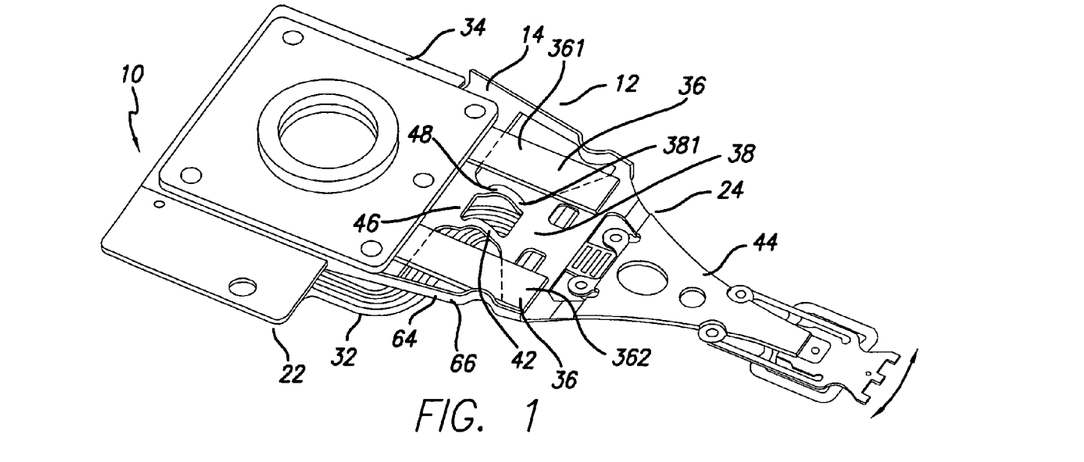
FIG. 1 is an oblique view of the invention suspension in one embodiment.
Figure 2:
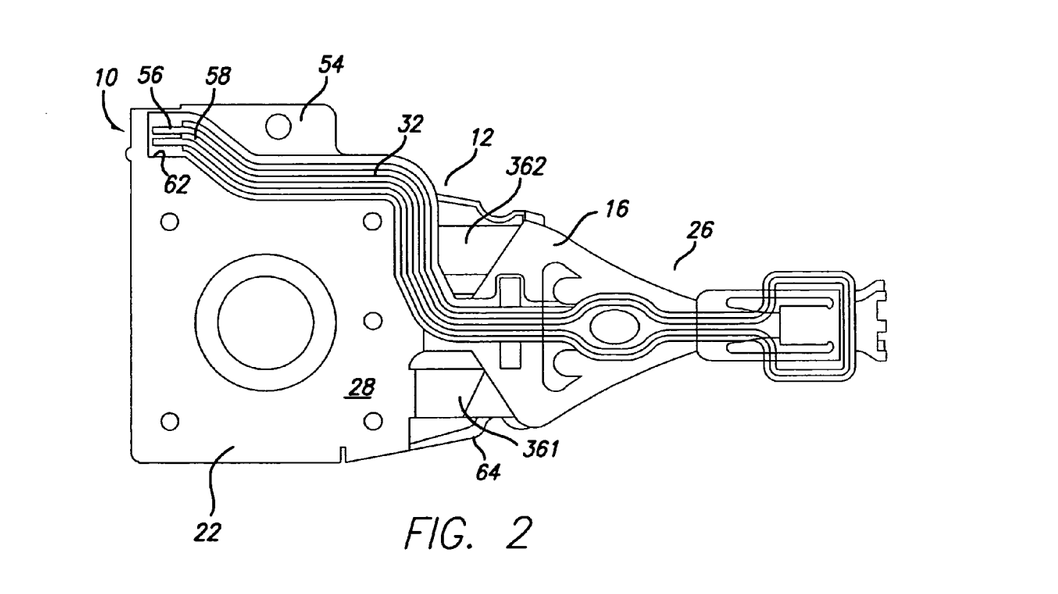
FIG. 2 is a plan view thereof.
Figure 3:
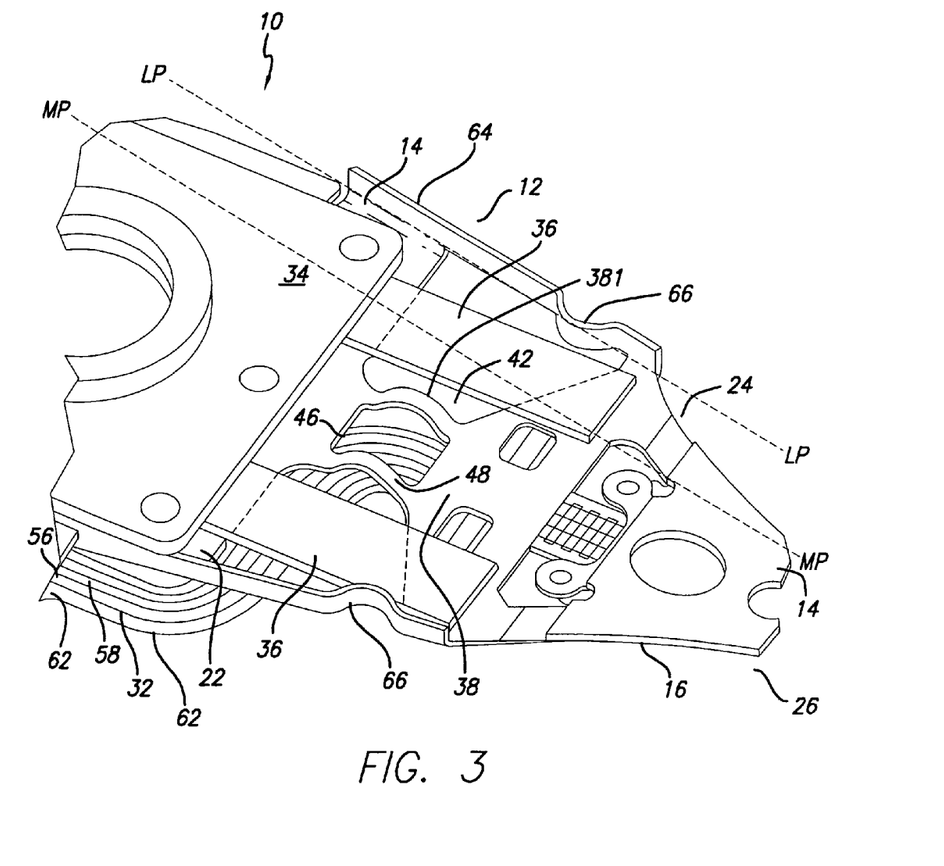
FIG. 3 is an oblique, enlarged fragmentary view of the microactuated portion thereof.
Figure 4A:
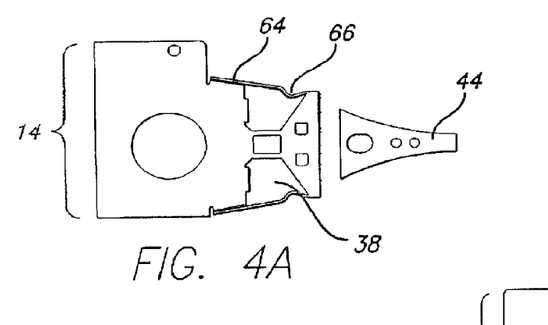
FIG. 4A is a plan view of the FIG. 1 suspension first outer layer.
Figure 4B:
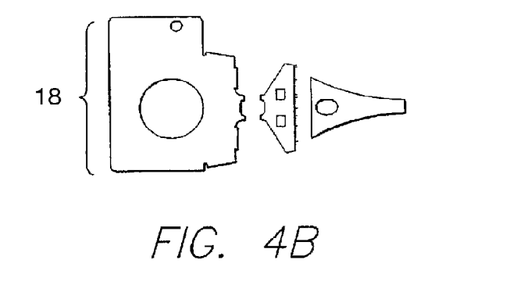
FIG. 4B is a plan view of the FIG. 1 suspension inner layer.
Figure 4C:
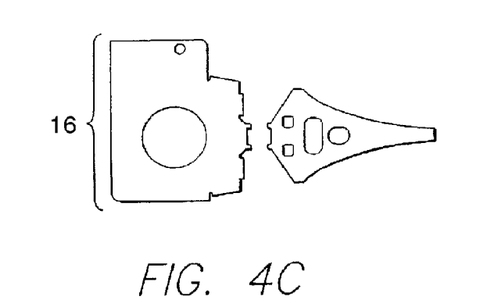
FIG. 4C is a plan view of the FIG. 1 suspension second outer layer.
Figure 4D:
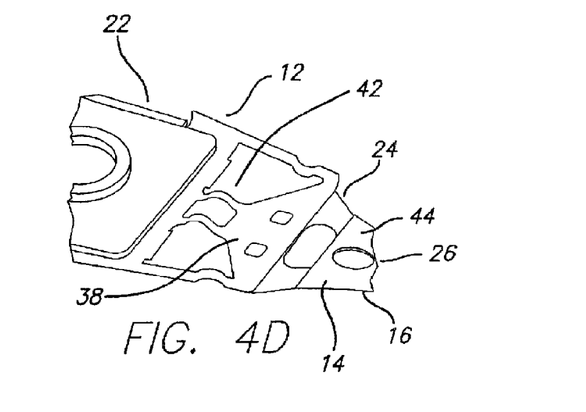
FIG. 4D is an oblique, fragmentary view of the FIG. 1 suspension microactuated portion with the microactuators removed.
Figure 5:
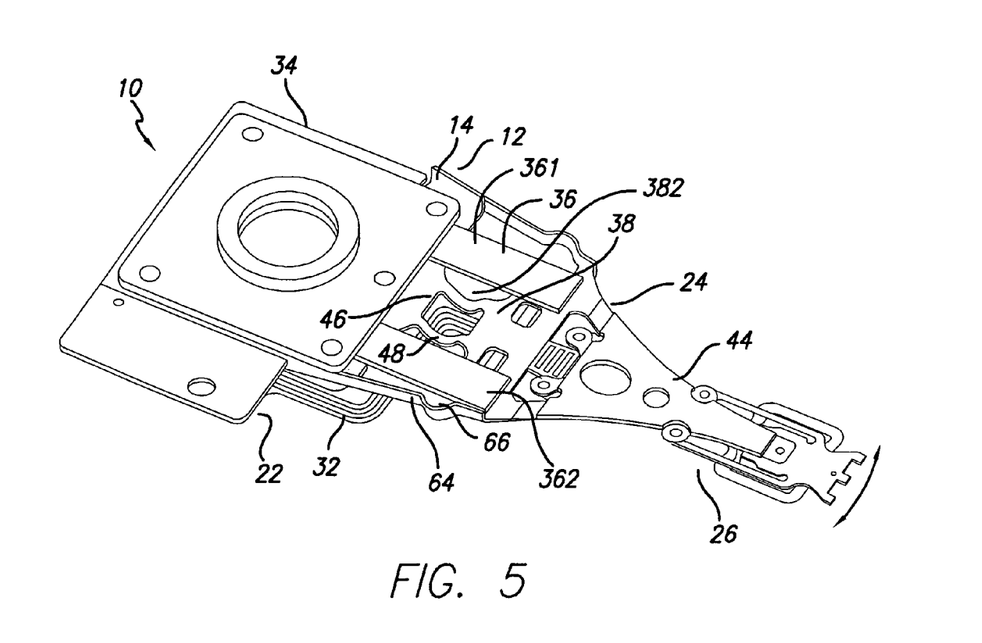
FIG. 5 is a view like FIG. 1 of an alternate embodiment.
Figure 6:
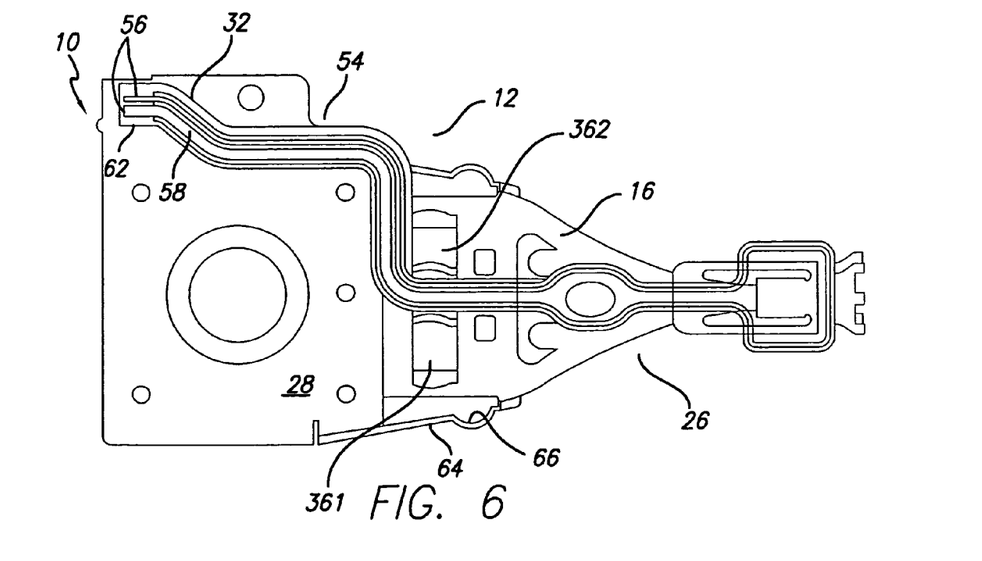
FIG. 6 is a plan view thereof.
Figure 7:
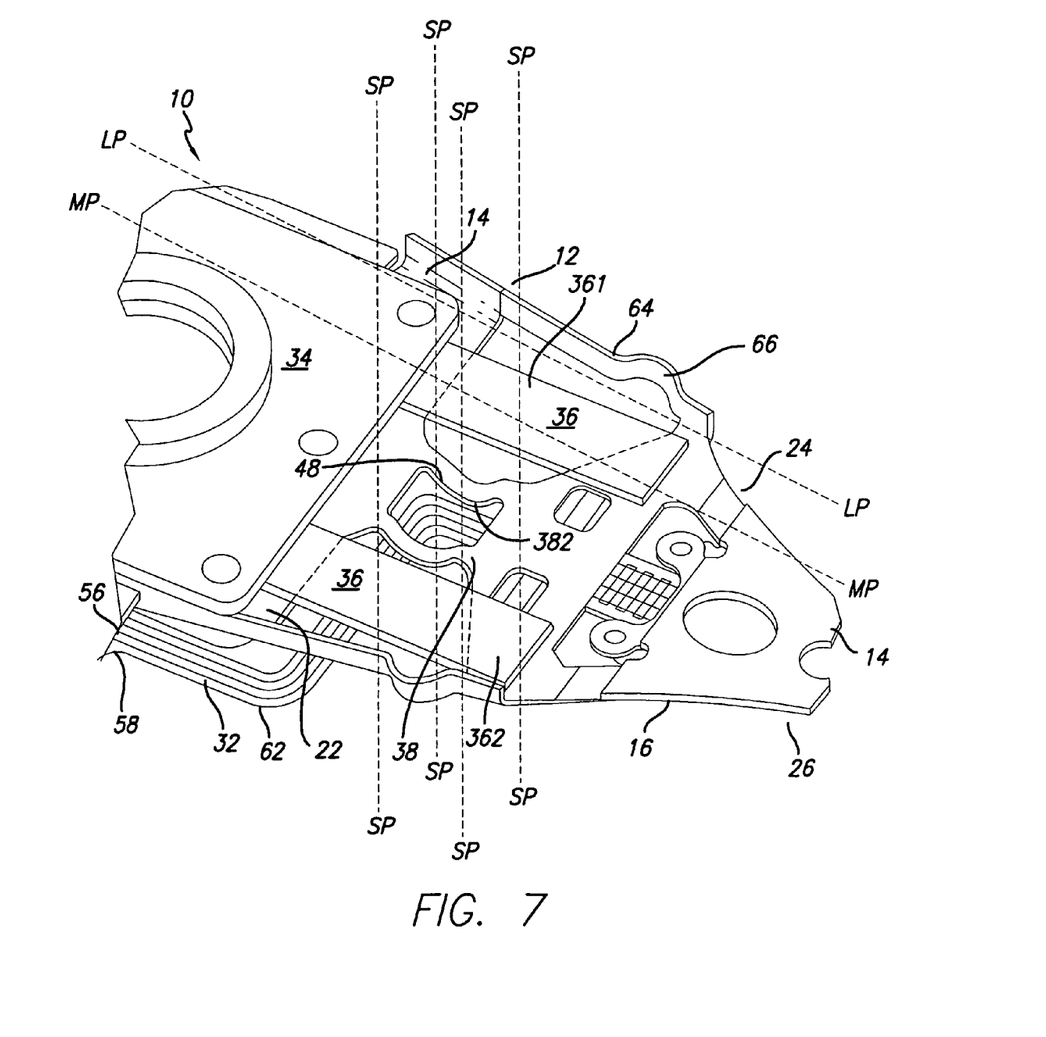
FIG. 7 is an oblique, enlarged fragmentary view of the microactuated portion thereof.
Figures 8A, 8B:
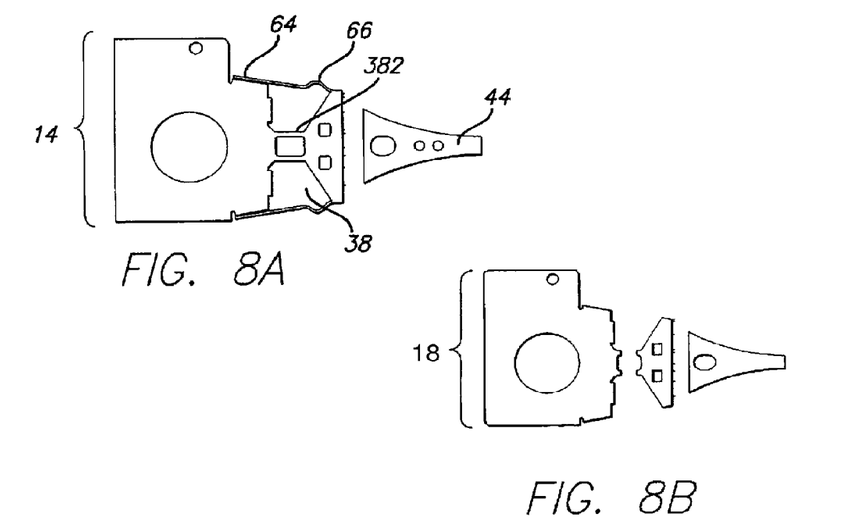
FIG. 8A is a plan view of the FIG. 5 suspension first outer layer.
FIG. 8B is a plan view of the FIG. 5 suspension inner layer.
Figure 8C:
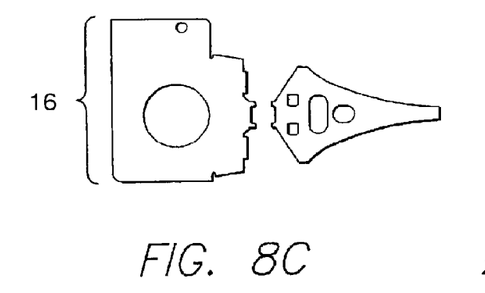
FIG. 8C is a plan view of the FIG. 5 suspension second outer layer.
Figure 8D:
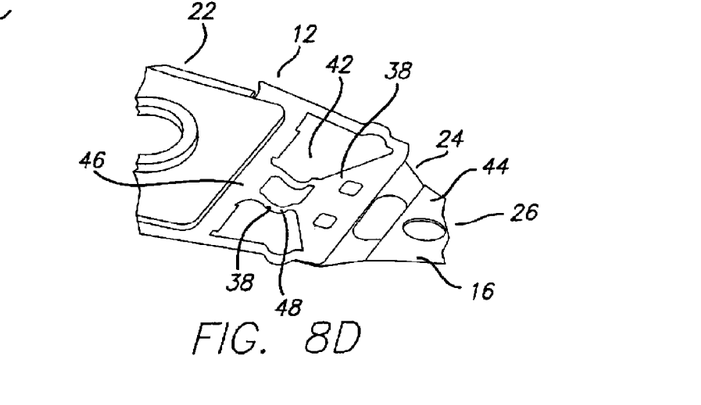
FIG. 8D is an oblique, fragmentary view of the FIG. 5 suspension microactuated portion with the microactuators removed.
Figure 13:
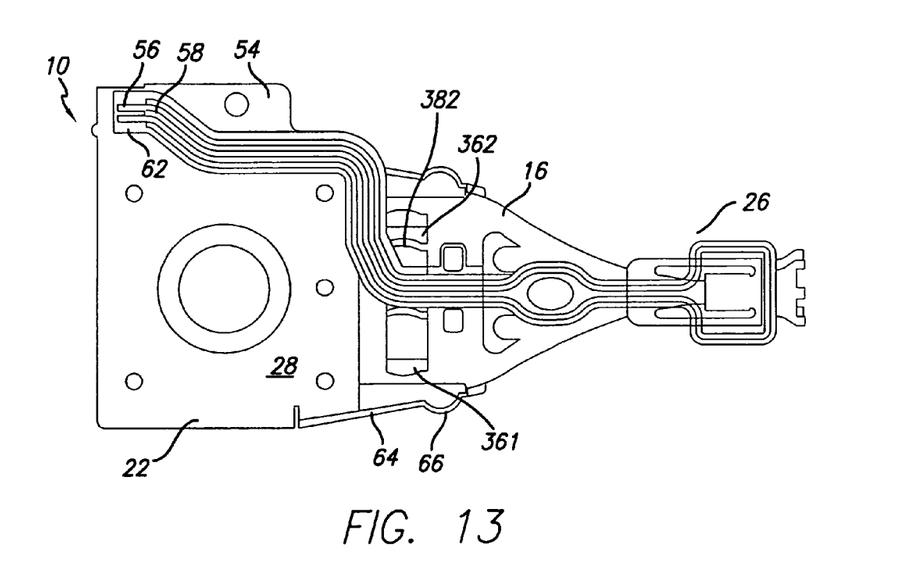
FIG. 13 is a plan view thereof.
Figure 14:
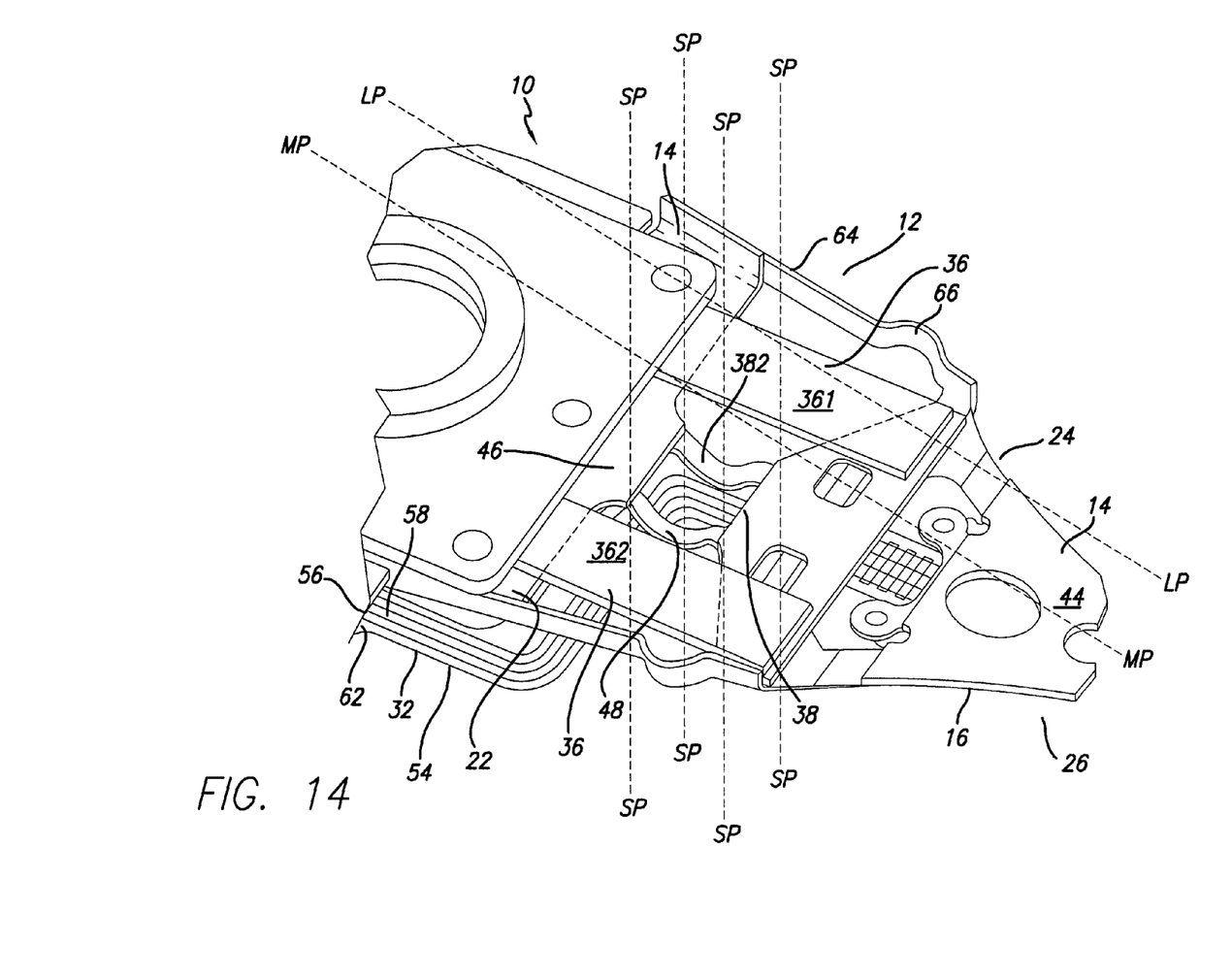
FIG. 14 is an oblique, enlarged fragmentary view of the microactuated portion thereof.
Figure 15A:
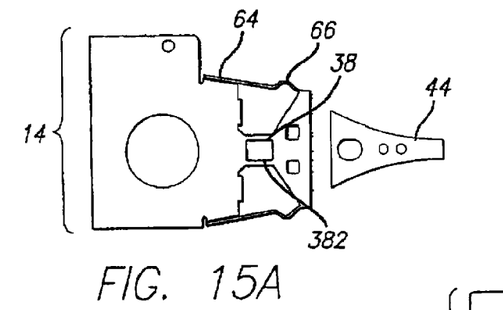
FIG. 15A is a plan view of the FIG. 12 suspension first outer layer.
Figure 15B:
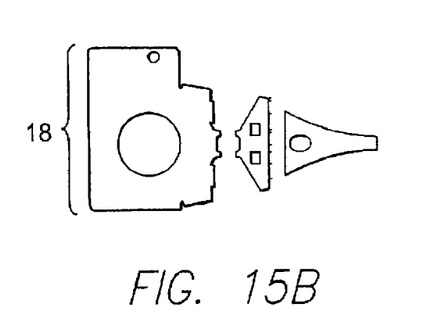
FIG. 15B is a plan view of the FIG. 12 suspension inner layer.
Figure 15C:
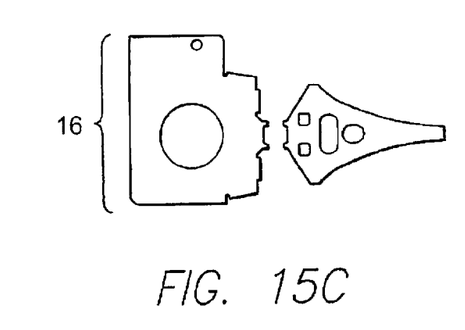
FIG. 15C is a plan view of the FIG. 12 suspension second outer layer.
Figure 15D:
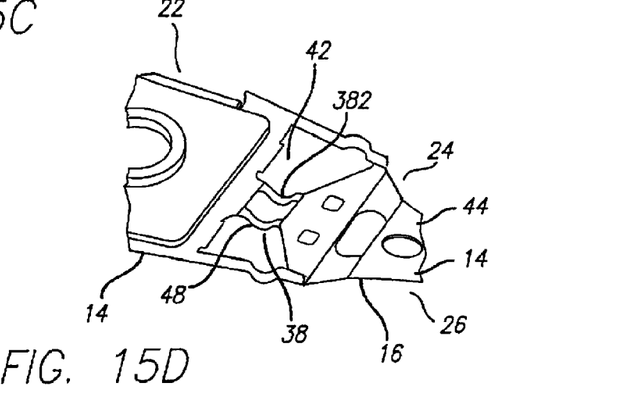
FIG. 15D is an oblique, fragmentary view of the FIG. 12 suspension microactuated portion with the microactuators removed.

With reference now to the drawings in detail, in which like numerals indicate like parts in the several views, in FIG. 1 (including FIGS. 2-4), 5 (including FIGS. 6-8), 9 (including FIGS. 10-11) and 12 (including FIGS. 13-15) a high stroke sensitivity microactuated disk drive suspension 10 is shown comprising a laminate 12 extending in a plane LP-LP. Laminate 12 comprises first and second outer layers 14, 16 respectively and a plastic inner layer 18. Suspension 10 then has a base portion 22 comprising the first outer layer 14, a spring portion 24 comprising the first or second outer layer 14, 16, and a beam portion 26 comprising the first and/or second outer layers 14, 16. Suspension 10 has a first side 28 for supporting a flexible circuit electrical interconnect 32 and a second oppositely facing side 34. Suspension 10 further has a microactuator 36 operatively coupled between the base portion 22 and the beam portion 26 for laterally shifting the beam portion (see arrows). Base portion 22 and beam portion 26 are connected through a first or second outer layer segment 38 that is locally arcuate at 42 normal to the plane LP-LP of the laminate 12.

In these Figures base portion 22 comprises the first outer layer 14. Spring portion 24 comprises the first outer layer 14 in FIGS. 1 and 5 and the second outer layer 16 in FIGS. 9 and 12. Beam portion 26 comprises the second outer layer 16. In FIGS. 1, 5, 9 and 12 the beam portion 26 further comprises a stiffener 44 that is usefully derived from a portion 46 of the first outer layer 14 in second outer layer stiffening relation, Typically in FIGS. 1 and 5 embodiments, segment 38 is a first outer layer segment 381 wherein the local arcuateness 48 of the segment extends from the laminate plane LP-LP away from the suspension first side 28. Microactuator 36 is shown in these embodiments to comprise separate microactuator elements 361, 362 defining spaced left and right hand microactuators, although the microactuator can be a unitary body in form with differently polarized and thus differentially responsive elements on either side. Where the microactuator 36 has spaced microactuator elements 361, 362, the segment 38 local arcuateness 48 extends in a plane SP-SP extending between the microactuators 361, 362, and in the FIG. 1 embodiment physically between the microactuator elements.

In general, the suspension 10 further includes a flexible circuit 32 such as an additive assembly 54 of laminated conductive traces 56 disposed on an insulative layer 58 disposed on a metal layer support 62, supported on the suspension first side 28. The microactuator has a major plane MP-MP generally parallel with the laminate plane LP-LP. The suspension 10 further defines an edge rail 64 laterally of the microactuator 36 in microactuator protecting relation against forces acting normal to the microactuator major plane MP-MP. Typically, the edge rail is locally deflected at 66 to facilitate the lateral shifting of the beam portion 26. More particularly, microactuator 36 major plane MP-MP is generally parallel with the laminate plane LP-LP with the suspension 10 defining left and right edge rails 64 laterally on either side of the microactuator 36 in microactuator protecting relation against forces acting normal to the microactuator major plane, the edge rails being locally deflected at 66 in beam portion lateral movement bendably accommodating relation while protecting the microactuator from forces normal to the beam portion 26 lateral movement.

In the FIGS. 5-8 embodiment, the local arcuateness 48' of the segment 38 is reversed and the segment 382 extends from the laminate plane LP-LP toward the suspension first side 28, the microactuator 36 comprises spaced left and right hand microactuators 361, 362, the segment local arcuateness extending physically between the microactuators. The suspension 10 further includes the flexible circuit interconnect 32 supported on the suspension first side 28. Microactuator major plane MP-MP is generally parallel with the laminate plane LP-LP. The suspension 10 defines an edge rail 64 laterally of the microactuator 36 in microactuator protecting relation against forces acting normal to the microactuator major plane MP-MP, the edge rail being locally deflected at 66 to facilitate the lateral shifting of the beam portion 26. Or microactuator major plane MP-MP is generally parallel with the laminate plane LP-LP, the suspension 10 defines left and right edge rails 64 laterally on either side of the microactuator 36 in microactuator protecting relation against forces acting normal to the microactuator major plane MP-MP, the edge rails 64 being locally deflected at 66 in beam portion 26 lateral movement bendably accommodating relation while protecting the microactuator from forces normal to the beam portion lateral movement.

In further embodiments, see FIGS. 9-11 and 12-15, the spring portion 24 is formed from second outer layer 16 rather than first outer layer 14. Thus in these embodiments, the invention provides a high stroke sensitivity microactuated disk drive suspension 10 in which the base portion 22 comprises the first outer layer 14, the spring portion 24 comprises the second outer layer 16, and the beam portion 26 also comprises the second outer layer.

Figure 9:
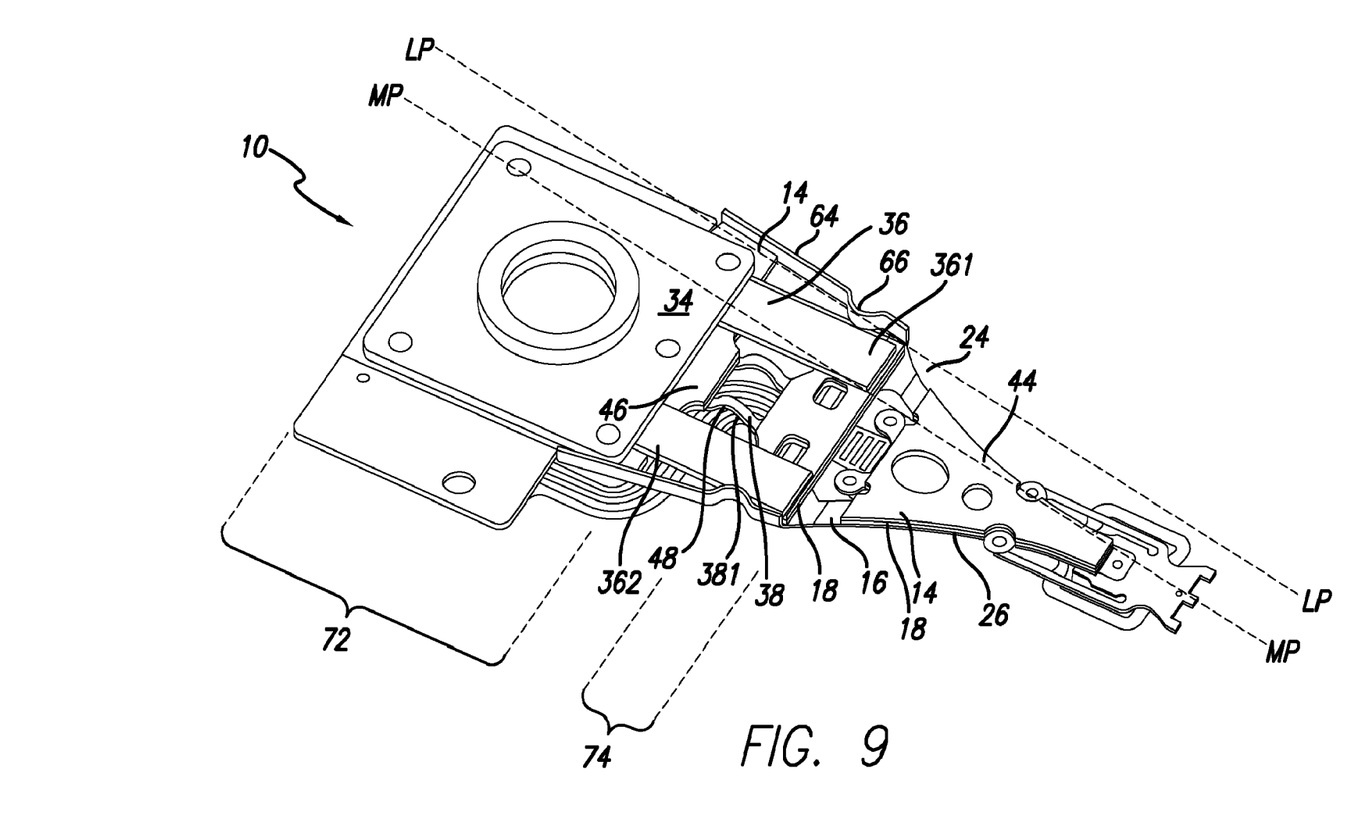
FIG. 9 is an oblique view of like FIG. 1 of a further alternate embodiment.
Figure 10:
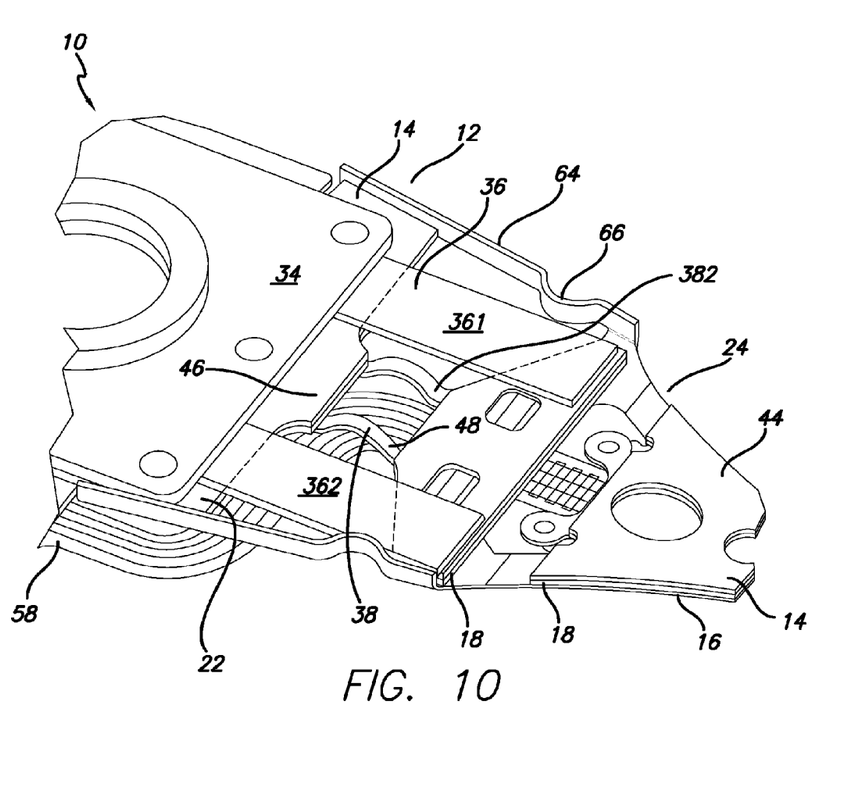
FIG. 10 is an oblique, enlarged fragmentary view of the microactuated portion thereof.
Figure 11A:
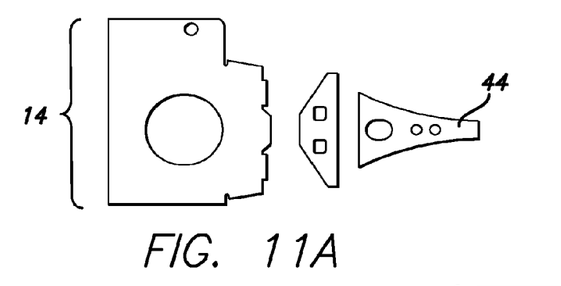
FIG. 11A is a plan view of the FIG. 9 suspension first outer layer.
Figures 11B, 11C, 11D:
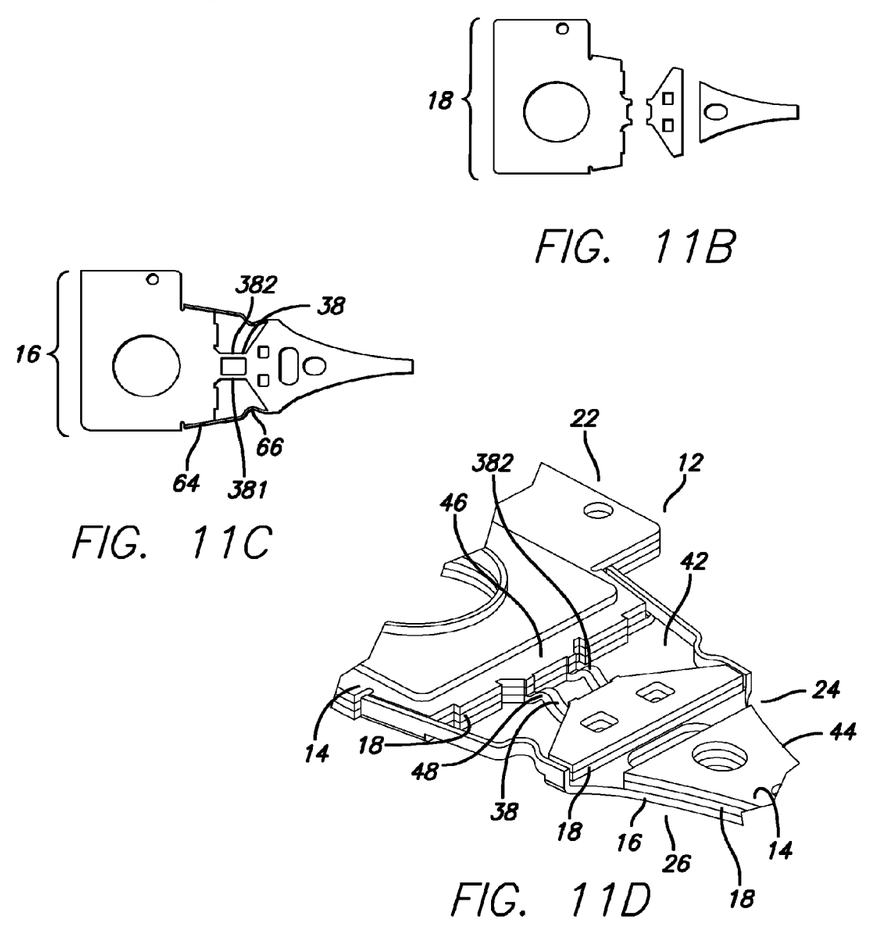
FIG. 11B is a plan view of the FIG. 9 suspension inner layer.
FIG. 11C is a plan view of the FIG. 9 suspension second outer layer.
FIG. 11D is an oblique, fragmentary view of the FIG. 9 suspension microactuated portion with the microactuators removed.
Figure 12:
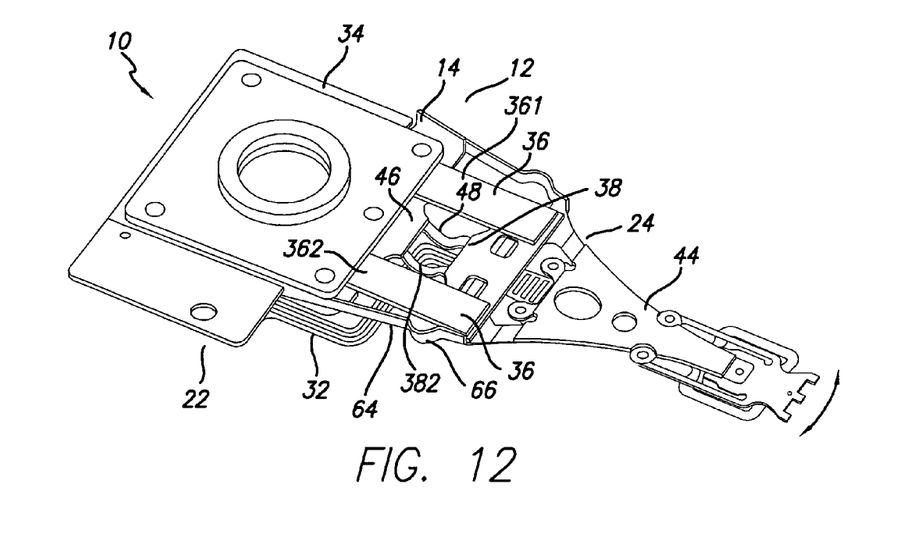
FIG. 12 is a view like FIG. 1 of a further embodiment.

The embodiments of FIGS. 9 and 12 have the beam portion 26 further comprising a separate (from segment 38) portion 46 of the first outer layer 14 in second outer layer 16 stiffening relation. In these embodiments, too, the segment 38 is a portion of second outer layer 16. The local arcuateness 48 of the segment 38 extends from the laminate plane LP-LP away from the suspension first side 28. The microactuator 36 comprises spaced left and right hand microactuators 361, 362. The segment local arcuateness 48 extends in a plane SP-SP between the microactuators 361, 362. As previously, the suspension 10 further includes a flexible circuit 32 supported on the suspension first side 28. Microactuator 36 has a major plane MP-MP generally parallel with the laminate plane LP-LP. Suspension 10 again defines an edge rail 64 laterally of the microactuator 36 in microactuator protecting relation against forces acting normal to the microactuator major plane MP-MP, the edge rail being locally deflected at 66 to facilitate the lateral shifting of the beam portion 26. Or, microactuator 36 major plane MP-MP is generally parallel with the laminate plane LP-LP, the suspension defines left and right edge rails 64 laterally on either side of the microactuator in microactuator protecting relation against forces acting normal to the microactuator major plane, the edge rails being locally deflected at 66 in beam portion laterally movement bendably accommodating relation while protecting the microactuator from forces normal to the beam portion 26 lateral movement.

Alternatively, see FIG. 12, the local arcuateness 48 of the segment 38 extends from the laminate plane LP-LP toward the suspension first side 28. Microactuator 36 comprises spaced left and right hand microactuators 361, 362. The segment local arcuateness 48 extends in a plane SP-SP extending between the microactuators 361, 362 and the suspension 10 further includes a flexible circuit 32 supported on the suspension first side 28. As in other embodiments, the microactuator 36 major plane MP-MP is generally parallel with the laminate plane LP-LP, the suspension 10 defines an edge rail 64 laterally of the microactuator in microactuator protecting relation against forces acting normal to the microactuator major plane, the edge rail 64 being locally deflected at 66 to facilitate the lateral shifting of the beam portion 26; the suspension can define left and right edge rails 64 laterally on either side of the microactuator in microactuator protecting relation against forces acting normal to the microactuator major plane, the edge rails being locally deflected at 66 in beam portion lateral movement bendably accommodating relation while protecting the microactuator from forces normal to the beam portion lateral movement.

In further detail, high stroke sensitivity microactuated disk drive suspension 10 comprises a laminate 12 of first and second outer layers 14, 16 and a plastic inner layer 18, the suspension having a base portion 22 comprising the first outer layer, a spring portion 24 comprising the first or second outer layer 14, 16, and a beam portion comprising the second outer layer 16. Suspension base portion has proximate and distal regions 72, 74, respectively, attached to each other by a segment 38 of the first or second outer layers 14, 16. The microactuator 36 is affixed between the base portion 22 and the beam portion 26 for shifting the beam portion laterally relative to the base portion. The first (or second) outer layer segment 38 has a local arcuateness 48 to readily bendable during the shifting for low resistance to the relative shifting, whereby the suspension 10 has high stroke sensitivity.

Typically in these embodiments, there is further included a flexible circuit electrical interconnect 32 supported by the suspension 10, the laminate outer layer 14 comprises a stainless steel, or both the laminate first and second outer layer 14, 16 comprises a stainless steel, the inner layer 18 comprises polyimide. The polyimide inner layer 18 is arranged to respond in shear between the first outer layer 14 and the second outer layer 16 during relative shifting of the base portion 22 and the beam portion 26. A stiffener 44 is attached to the beam portion 26, e.g. a stiffener defined by a further portion 46 of the first outer layer 14. First outer layer 14 (or second outer layer 16) locally arcuate segment 38 extends out of the plane of the first outer layer away from the plane of the second outer layer in the FIGS. 1 and 9 embodiments, and in FIGS. 5 and 12 embodiments, the first outer layer locally arcuate segment 38 extends out of the plane of the first outer layer toward the plane of the second outer layer. Microactuator 36 comprises first and second separately actuable elements 361, 362 fixed to the base portion first outer layer 14 and the beam portion second outer layer 16, the first and second microactuator elements being laterally spaced. The locally arcuate segment 38 extends physically between the microactuators in FIGS. 1 and 9 and in a plane SP-SP extending between the microactuators in FIGS. 5 and 12 where locally arcuate segment 38 extends oppositely from FIGS. 1 and 9. The locally arcuate segment typically in these embodiments comprises spaced left and right actuate bands 381, 382 extending between the microactuators 361, 362. As shown, the first outer layer 14 defines left and right edge rails 64 extending laterally of the microactuators 361, 362 in microactuator protecting relation against vertically bending forces thereon; the left and right edge rails being locally deflected to facilitate beam portion 26 lateral shifting adjacent the microactuators.

In a further embodiment having flexure adjustment, a high stroke sensitivity microactuated disk drive suspension 10 is provided comprising a laminate 12 of first and second outer layers 14, 16 and a plastic inner layer 18. Suspension 10 has a base portion 22 comprising the first outer layer 14, a spring portion 24 comprising the first or second outer layers 14, 16, and a beam portion 26 comprising a the first and/or second outer layers 14, 16. Base portion has proximate and distal regions 72, 74 attached by a segment 38 of the first outer layer 14. A microactuator 36 is fixed between the base portion 22 and the beam portion 26 for shifting the beam portion laterally relative to the base portion. Beam portion 26 has an area 76 supporting a flexure 78 and a distal terminus 82 beyond the flexure. The distal terminus 82 has laterally spaced tabs 84 arranged to mechanically adjust the configuration of the beam portion area 76 supporting the flexure 78 and the flexure thereby responsive to bending force on the tabs.

In the method aspects of this just previous embodiment, the invention provides a method of adjusting the flexure 78 of a disk drive suspension 10 comprising a laminate 12 of first and second outer layers 14, 16 and a plastic inner layer 18. Suspension 10 has a base portion 22 comprising the first outer layer 14, a spring portion comprising the first or second outer layers 14, 16, and a beam portion 26 comprising the second layer, including defining on the beam portion an area 76 supporting the flexure 78, defining a beam portion distal terminus 82 beyond the flexure having bendable laterally spaced tabs 84, and mechanically adjusting the configuration of the beam portion area and the flexure thereby in response to bending of the tabs.

In other method aspects of the invention, there is provided the method of manufacturing a high stroke sensitivity microactuated disk drive suspension 10, including forming from a laminate 12 of first and second outer layers 14, 16 and a plastic inner layer 18 a base portion 22, a spring portion 24, and a beam portion 26, coupling base portion proximate and distal regions 72, 74 with a locally arcuate segment 38 thereof, and fixing a microactuator 36 to the proximate and distal regions for relative shifting thereof, whereby the segment bends readily during the shifting for low resistance to shifting and the suspension has high stroke sensitivity.

In this and like embodiments, typically, the method further includes forming the base portion 22 and the segment 38 from the first outer layer 14, or forming the beam portion 26 and the segment 38 from the second outer layer 16, forming edge rails 64 on the base portion, and fixing differentially actuable left and right microactuators 361, 362 for shifting of the beam portion relative to the base portion while connecting the beam and base portions with the arcuate segment 38 of the first or second outer layer.

An illustrative comparison of the present invention laminate suspension with locally arcuate parts and a single thickness metal suspension without arcuate parts is depicted in the Table following:

TABLE

Critical Performance Comparisons

|  | Stroke Sensitivity * (nm//volt) | $1^{st}$ Torsion (Hz) | Sway (Hz) |
|---|---|---|---|
| Invention | 27 | 9537 | 21311 |
| Prior Art | 16 | 9000 | 18500 |

*PZT thickness: 0.005", $d_{31} = 320 \times 10^{-12}$ m/volt

Typically, laminate first outer layer 14 (e.g. FIG. 4A, 8A, etc.) is a rigid member of a suitable material and generally comprises a metal, such as stainless steel, e.g. 0.0025 inch thick. Laminate second outer layer 16 (FIG. 4C, 8, etc.) is similarly of a suitable material and generally comprises a metal such as stainless steel, e.g. 0.001 to 0015 inch thick where this second outer layer defines the spring portion 24. Suspension laminate 12 inner layer 18 (FIG. 4B, 8B, etc.) typically comprises polyimide, but can be any plastic that is adherent or can be made adherent sufficiently to bond together the adjoining layers 14, 16.

The invention thus provides an improved disk drive suspension having a suspension load beam formed from a laminate of first and second outer layers joined by an inner layer of plastic and supporting an electrical interconnect that can be a flexible circuit. The microactuated suspension has increased stroke sensitivity through the use of a relatively thin laminate layer to define the relatively shiftable suspension beam portion parts and to have even these easier bending parts locally arcuately shaped for less resistance to bending and parts shifting. A stiffener is defined with one laminate outer layer and the beam portion with another laminate outer layer that can also define the spring portion. The local arcuate shape can also be formed in the second outer laminate layer. Flexure adjustment capability at the beam portion distal terminus is provided by defining bendable tabs whose repositioning adjusts the flexure.

The foregoing objects are thus met.

I claim:

1. A microactuated disk drive suspension comprising a laminate extending in a plane and having first and second outer layers and a plastic inner layer, said suspension having a base portion comprising said first outer layer, a spring portion comprising a said first or second outer layer, and a beam portion comprising a said first and/or second outer layer, said base portion having a proximate portion thereof, said suspension having a first side for supporting a flexible circuit and a second oppositely facing side, and a microactuator operatively coupled between said base proximate portion and said beam portion for laterally shifting said beam portion, said base proximate and beam portions being connected through a first or second outer layer segment that is locally arcuate normal to the plane of said laminate.

2. The microactuated disk drive suspension according to claim 1, in which said base portion comprises said first outer layer, said spring portion comprises said second outer layer, and said beam portion comprises said second outer layer.

3. The microactuated disk drive suspension according to claim 2, in which said segment is a second outer layer segment.

4. The microactuated disk drive suspension according to claim 3, in which the local arcuateness of said segment extends from said laminate plane away from said suspension first side.

5. The microactuated disk drive suspension according to claim 4, in which said microactuator comprises spaced left and right hand microactuators, said segment local arcuateness extending between said microactuators.

6. The microactuated disk drive suspension according to claim 5, in which said suspension further includes a flexible circuit supported on said suspension first side.

7. The microactuated disk drive suspension according to claim 6, in which said microactuator has a major plane generally parallel with said laminate plane, said suspension defines an edge rail laterally of said microactuator in microactuator protecting relation against forces acting normal to said microactuator major plane, said edge rail being locally deflected to facilitate said lateral shifting of said beam portion.

8. The microactuated disk drive suspension according to claim 3, in which said microactuator has a major plane generally parallel with said laminate plane, said suspension defines left and right edge rails laterally on either side of said microactuator in microactuator protecting relation against forces acting normal to said microactuator major plane, said edge rails being locally deflected in beam portion lateral movement bendably accommodating relation while protecting said microactuator from forces normal to said lateral movement.

9. The microactuated disk drive suspension according to claim 2, in which said microactuator has a major plane generally parallel with said laminate plane, said suspension defines left and right edge rails laterally on either side of said microactuator in microactuator protecting relation against forces acting normal to said microactuator major plane, said edge rails being locally deflected in beam portion lateral movement bendably accommodating relation while protecting said microactuator from forces normal to said lateral movement.

10. The microactuated disk drive suspension according to claim 1, in which said beam portion further comprises said first outer layer in second outer layer stiffening relation.

11. The microactuated disk drive suspension according to claim 1, in which said base portion comprises said first outer layer, said spring portion comprises said second outer layer, and said beam portion comprises said second outer layer.

12. The microactuated disk drive suspension according to claim 11, in which said beam portion further comprises said first outer layer in second outer layer stiffening relation.

13. The microactuated disk drive suspension according to claim 11, in which said segment is a second outer layer segment.

14. The microactuated disk drive suspension according to claim 13, in which the local arcuateness of said segment extends from said laminate plane away from said suspension first side.

15. The microactuated disk drive suspension according to claim 14, in which said microactuator comprises spaced left and right hand microactuators, said segment local arcuateness extending in a plane between said microactuators.

16. The microactuated disk drive suspension according to claim 15, in which said suspension further includes a flexible circuit supported on said suspension first side.

17. The microactuated disk drive suspension according to claim 16, in which said microactuator has a major plane generally parallel with said laminate plane, said suspension defines an edge rail laterally of said microactuator in microactuator protecting relation against forces acting normal to said microactuator major plane, said edge rail being locally deflected to facilitate said lateral shifting of said beam portion.

18. The microactuated disk drive suspension according to claim 13, in which the local arcuateness of said segment extends from said laminate plane toward said suspension first side.

19. The microactuated disk drive suspension according to claim 18, in which said microactuator comprises spaced left and right hand microactuators, said segment local arcuateness extending in a plane between said microactuators.

20. The microactuated disk drive suspension according to claim 19, in which said suspension further includes a flexible circuit supported on said suspension first side.

21. The microactuated disk drive suspension according to claim 20, in which said microactuator has a major plane generally parallel with said laminate plane, said suspension defines an edge rail laterally of said microactuator in microactuator protecting relation against forces acting normal to said microactuator major plane, said edge rail being locally deflected to facilitate said lateral shifting of said beam portion.

22. The microactuated disk drive suspension according to claim 18, in which said microactuator has a major plane generally parallel with said laminate plane, said suspension defines left and right edge rails laterally on either side of said microactuator in microactuator protecting relation against forces acting normal to said microactuator major plane, said edge rails being locally deflected in beam portion lateral movement bendably accommodating relation while protecting said microactuator from forces normal to said lateral movement.

23. The microactuated disk drive suspension according to claim 11, in which said microactuator has a major plane generally parallel with said laminate plane, said suspension defines left and right edge rails laterally on either side of said microactuator in microactuator protecting relation against forces acting normal to said microactuator major plane, said edge rails being locally deflected in beam portion lateral movement bendably accommodating relation while protecting said microactuator from forces normal to said lateral movement.

24. The suspension of claim 1 in which said segment is a second outer layer segment.

25. The suspension of claim 24 in which said spring portion comprises said second outer layer.

26. The suspension of claim 24 in which said spring portion comprises said first outer layer.

27. The suspension of claim 1 in which said segment is a first outer layer segment.

28. The suspension of claim 1 in which said first and second outer layers have different thicknesses.

29. The suspension of claim 1 in which said spring portion and said arcuate segment are comprised of the same one of said first and second outer layers.

30. The suspension of claim 1 in which said spring portion and said arcuate segment are comprised of different ones of said first and second outer layers.

31. The suspension of claim 1 in which said base portion further comprises said first outer layer and said plastic inner layer, and said beam portion comprises said first and said second outer layers and said plastic inner layer.

32. The suspension of claim 1 in which said spring portion and said segment comprise the same one of said first and second outer layers, and the second outer layer is thinner than the first outer layer.

33. A microactuated disk drive suspension comprising a laminate of first and second outer layers and a plastic inner layer, said suspension having a base portion comprising said first outer layer, a spring portion comprising said second outer layer, and a beam portion comprising said second outer layer, said base portion having proximate and distal regions attached by a segment of said second outer layer, a microactuator fixed between said base portion proximate region and said beam portion for shifting said beam portion laterally relative to said base portion, said second outer layer segment having a locally arcuate part to be readily bendable during said shifting for low resistance to said relative shifting, said base portion distal region comprising said first and second outer layers and said plastic inner layer.

34. The microactuated disk drive suspension according to claim 33, including also a flexible circuit supported by said suspension.

35. The microactuated disk drive suspension according to claim 33, in which at least one of said first and second laminate outer layers comprises stainless steel.

36. The microactuated disk drive suspension according to claim 35, in which both said laminate first and second outer layers comprise stainless steel.

37. The microactuated disk drive suspension according to claim 33, in which said inner layer comprises polyimide.

38. The microactuated disk drive suspension according to claim 37, in which said polyimide inner layer is arranged to respond in shear between said first outer layer and said second outer layer during relative shifting of said base portion and said beam portion.

39. The microactuated disk drive suspension according to claim 33, including also a stiffener attached to said beam portion.

40. The microactuated disk drive suspension according to claim 39, in which said stiffener is defined by said first outer layer.

41. The microactuated disk drive suspension according to claim 33, in which said second outer layer locally arcuate segment part extends out of the plane of said second outer layer away from the plane of said first outer layer.

42. The microactuated disk drive suspension according to claim 33, in which said second outer layer locally arcuate segment part extends out of the plane of said second outer layer toward the plane of said first outer layer.

43. The microactuated disk drive suspension according to claim 33, in which said microactuator comprises first and second elements separately fixed to said base portion first outer layer and said beam portion first outer layer.

44. The microactuated disk drive suspension according to claim 43, in which said first and second microactuator elements are laterally spaced, said locally arcuate segment part extending between said microactuators.

45. The microactuated disk drive suspension according to claim 44, in which said locally arcuate segment part comprises spaced left and right arcuate bands extending between said microactuators.

46. The microactuated disk drive suspension according to claim 33, in which said second outer layer further defines left and right edge rails extended laterally of said microactuators in microactuator protecting relation against vertical bending forces thereon.

47. The microactuated disk drive suspension according to claim 46, in which said left and right edge rails are locally deflected to facilitate lateral shifting adjacent said microactuators.

48. The microactuated disk drive suspension according to claim 47, including also a stiffener attached to said beam portion.

49. The microactuated disk drive suspension according to claim 48, in which said stiffener is defined by said first outer layer.

50. A microactuated disk drive suspension comprising a laminate of first and second outer layers and a plastic inner layer, said suspension having a base portion comprising said first outer layer, a spring portion comprising said second outer layer, and a beam portion comprising said second outer layer, said base portion having proximate and distal regions attached by a segment of said second outer layer, a microactuator fixed between said base portion proximate region and said beam portion for shifting said beam portion laterally relative to said base portion, said second outer layer segment having a locally arcuate part to be readily bendable during said shifting for low resistance to said relative shifting.

51. The microactuated disk drive suspension according to claim 50, including also a flexible circuit supported by said suspension.

52. The microactuated disk drive suspension according to claim 50, in which a said second outer layer comprises stainless steel.

53. The microactuated disk drive suspension according to claim 50, in which both said laminate second first and outer layers comprise stainless steel.

54. The microactuated disk drive suspension according to claim 53, in which said polyimide inner layer is arranged to respond in shear between said first outer layer and said second outer layer during relative shifting of said base portion and said beam portion.

55. The microactuated disk drive suspension according to claim 50, in which said inner layer comprises polyimide.

56. The microactuated disk drive suspension according to claim 50, in which said second outer layer locally arcuate segment part extends out of the plane of said second outer layer away from the plane of said first outer layer.

57. The microactuated disk drive suspension according to claim 50, in which said second outer layer locally arcuate segment part extends out of the plane of said second outer layer toward the plane of said first outer layer.

58. The microactuated disk drive suspension according to claim 50, in which said microactuator comprises first and second elements separately fixed to said base portion first outer layer and said beam portion second outer layer.

59. The microactuated disk drive suspension according to claim 58, in which said first and second microactuator elements are laterally spaced, said locally arcuate segment part extending between said microactuators.

60. The microactuated disk drive suspension according to claim 59, in which said locally arcuate segment part comprises spaced left and right arcuate bands extending between said microactuators.

61. The microactuated disk drive suspension according to claim 50, in which said second outer layer further defines left and right edge rails extended laterally of said microactuators in microactuator protecting relation against vertical bending forces thereon.

62. The microactuated disk drive suspension according to claim 61, in which said left and right edge rails are locally deflected to facilitate lateral shifting adjacent said microactuators.

* * * * *